Aug. 31, 1937. C. V. RASMUSSEN 2,091,879
AUXILIARY EMERGENCY AND SAFETY VEHICLE WHEEL
Filed Jan. 5, 1935
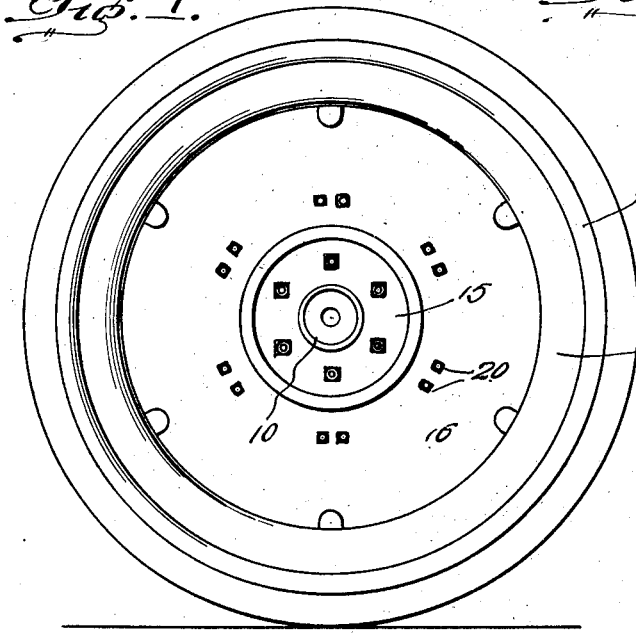
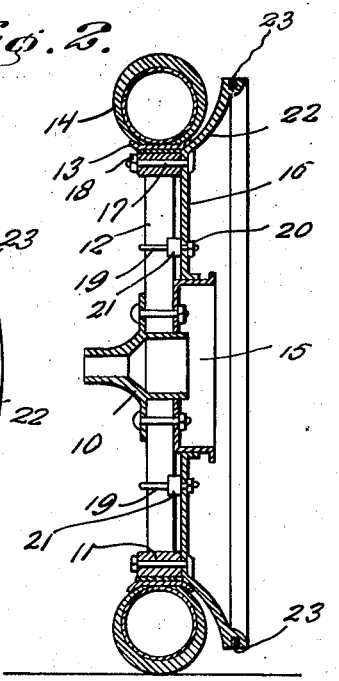
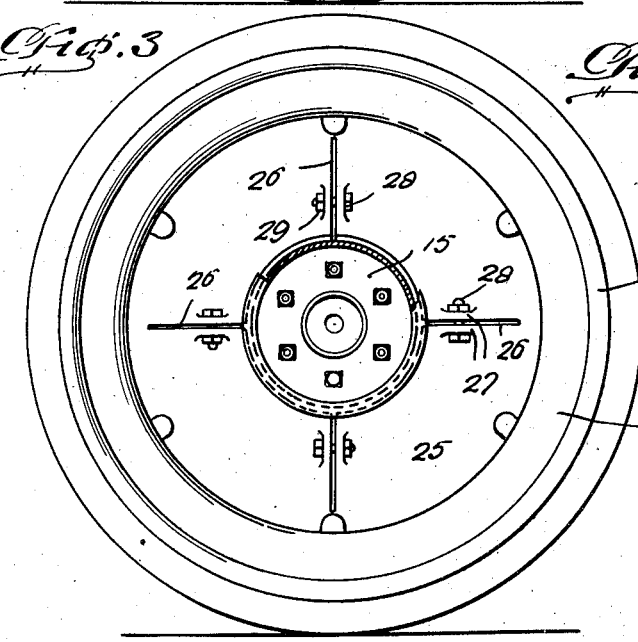
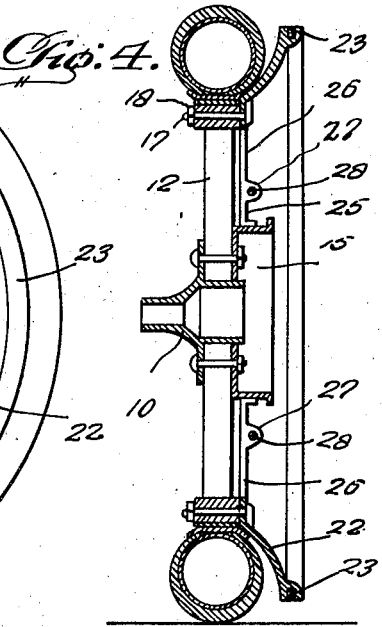
Carl V Rasmussen INVENTOR.
BY J Stanley Bunch
ATTORNEY.

Patented Aug. 31, 1937

2,091,879

UNITED STATES PATENT OFFICE 2,091,879

AUXILIARY EMERGENCY AND SAFETY VEHICLE WHEEL

Carl V. Rasmussen, Minneapolis, Minn.

Application January 5, 1935, Serial No. 562

1 Claim. (Cl. 301—39)

The present invention comprehends the provision of a combined emergency and safety wheel adapted to be attached to a pneumatic tired vehicle wheel, and utilized to prevent skidding of the vehicle incident to the deflation of the pneumatic tire, as well as to prevent the deflated tire from being cut or injured by the rim.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a side elevation of a pneumatic tired wheel equipped with an emergency and safety wheel constructed in accordance with one embodiment of the invention.

Figure 2 is a vertical sectional view therethrough.

Figure 3 is a view similar to Figure 1 of a modified construction.

Figure 4 is a vertical sectional view through Figure 3.

Referring to the drawing in detail and more particularly to Figures 1 and 2, 10 indicates the hub of a vehicle wheel of ordinary known wheel construction, the felly being indicated at 11 and the spokes at 12. The tire carrying rim is represented at 13 and supports the tire 14. Carried by the wheel in the ordinary well known manner is the brake drum 15.

The combined emergency and safety wheel forming the subject matter of my invention, preferably includes a disk-like body 16 which may be attached to the pneumatic tired vehicle wheel in any suitable manner. For the purpose of illustrating one embodiment of the invention I have shown the safety wheel attached to both the felly 11 and also to the spokes 12 of the vehicle wheel. In this connection bolts 17 are passed through the disk-like portion 16 of the safety wheel and through the felly 11 of the vehicle wheel, and provided with nuts 18. Substantially U-shaped bolts 19 embrace the spokes 12 and are passed through the disk-like body portion of the safety wheel and are connected therewith by the nuts 20. Filler blocks 21 are arranged between the spokes and the disk-like body portion as illustrated in Figure 2. As above stated, however, the essence of the invention resides in the provision of a combined emergency and safety wheel of the character illustrated for the purpose intended, and the means employed for attaching the emergency and safety wheel to the tired vehicle wheel may vary, without departing from the spirit of the invention. Obviously, suitable means may be provided to properly attach the emergency and safety wheel to a vehicle wheel of the wire spoke type.

The disk-like body 16 of the combined emergency and safety wheel has an outwardly curved marginal portion indicated at 22 which is disposed at one side of the vehicle wheel and formed to provide a relatively wide periphery 23. It will be noted that the curved portion 22 with its periphery 23 is spaced at such distance from the vehicle wheel so as not to contact or interfere in any way with the tire after the latter becomes flattened or substantially deflated. Furthermore the curved portion 22 and periphery 23 of the safety wheel may vary in size and strength to adapt itself to the size or weight of the vehicle on which it is used.

The periphery 23 is provided with a circumferential series of threaded openings to accommodate traction lugs. If use of lugs is desired they may be quickly and conveniently threaded into the openings in the periphery 23.

The disk-like portion 16 of the safety wheel may be formed with a central opening to receive the brake drum 15, in which case the latter assists in supporting the combined emergency and safety wheel in position for use. When the wheel is attached to the pneumatic tired vehicle wheel, the periphery 23 is normally spaced from the ground or surface over which the vehicle wheel travels, but should the tire 14 become punctured or substantially deflated, the auxiliary wheel is brought into contact with the ground, to prevent skidding or slipping of the vehicle over the surface, as well as to prevent the deflated tire from being cut or injured by its rim.

In Figures 3 and 4 I have illustrated a slightly modified form of the invention, which differs from the preferred form in that the disk-like body 25 of the auxiliary wheel is provided with radially disposed slots 26 which lead from the central opening in said portion which receives the brake drum 15 of the wheel. Otherwise the construction in Figures 3 and 4 is the same as hereinabove described and mounted on the wheel 10 in the same manner. Arranged at opposite sides of each slot 26 are lugs 27 through which a bolt 28 is adapted to be passed and subsequently associated with a nut 29, and when the nuts are tightened the auxiliary wheel is snugly clamped on the brake drum 15.

While it is believed that from the foregoing description the nature and advantages of the invention will be better understood I desire to have it known that I do not limit myself to what is herein shown or described and that such changes may be resorted to when desired as fall within the scope of what is claimed.

What I claim is:

An emergency and safety wheel of the character described including a one-piece wheel member having a disk-like body portion and an annular marginal portion integral with said body portion, said marginal portion being formed with a cylindrical peripheral ground-engaging surface, said body portion being formed with a central opening and provided with a lateral annular flange at said opening to receive a brake drum, said body portion having a series of uniformly spaced slots leading outwardly from said central opening, lugs integral with said body portion at opposite sides of said slots, and bolts associated with said lugs for contracting the inner slotted part of said body portion and bringing said lateral flange into tight gripping engagement with the brake drum.

CARL V. RASMUSSEN.